(12) United States Patent
Kurihara et al.

(10) Patent No.: US 7,047,398 B2
(45) Date of Patent: May 16, 2006

(54) ANALYZING INSTRUCTION COMPLETION DELAYS IN A PROCESSOR

(75) Inventors: Toshihiko Kurihara, Kanagawa-ken (JP); Hung Qui Le, Austin, TX (US); Alexander Erik Mericas, Austin, TX (US); Robert Dominick Mirabella, Round Rock, TX (US); Michitaka Okuno, Nagano (JP); Masahiro Tokoro, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 10/210,358

(22) Filed: Jul. 31, 2002

(65) Prior Publication Data

US 2004/0024994 A1 Feb. 5, 2004

(51) Int. Cl.
*G06F 11/34* (2006.01)
(52) U.S. Cl. .................................................. 712/227
(58) Field of Classification Search ............... 712/227; 717/151, 128; 702/182, 183, 186
See application file for complete search history.

(56) References Cited

U.S. PATENT DOCUMENTS 5,802,273 A * 9/1998 Levine et al. ............... 714/47
5,987,598 A * 11/1999 Levine et al. ............... 712/227
6,338,159 B1 * 1/2002 Alexander et al. .......... 717/128
6,415,378 B1 * 7/2002 Davidson et al. ........... 712/207

OTHER PUBLICATIONS

Intel, "Pentium® Pro Family Developer's Manual, vol. 3: Operating System Writer's Guide," Dec. 1995, p. B1-B6.*

* cited by examiner

*Primary Examiner*—Eddie Chan
*Assistant Examiner*—David J. Huisman
(74) *Attorney, Agent, or Firm*—Mark E. McBurney; Dillon & Yudell LLP

(57) ABSTRACT

A method and system for identifying instruction completion delays for a group of instructions in a computer processor. Each instruction in the group of instructions has a status indicator that identifies what is preventing that instruction from completing execution. Examples of completion delays are cache misses, data dependencies or simply the time required for an execution unit in the computer processor to process the instruction. As each instruction finishes executing, its associated status indicator is cleared to indicate that the instruction is no longer waiting to execute. The last instruction to execute is the instruction that is holding up completion of the entire group, and thus the cause for the completion delay of the last instruction is recorded as the cause of completion delay for the entire group.

24 Claims, 4 Drawing Sheets

ANALYZING INSTRUCTION COMPLETION DELAYS IN A PROCESSOR

RELATED APPLICATION

The present invention is related to the subject matter of the following commonly assigned, copending U.S. patent application Ser. No. 10/210,357 entitled "SPECULATIVE COUNTING OF PERFORMANCE EVENTS WITH REWIND COUNTER" and filed Jul. 31, 2002. The content of the above-referenced application is incorporated herein by reference.

BACKGROUND OF THE INVENTION

1. Technical Field

The present invention relates in general to the field of computers, and, in particular, to computer processors. Still more particularly, the present invention relates to an improved method and system for determining a cause for an execution delay for an instruction or a group of instructions in the computer processor.

2. Description of the Related Art

Modern computer processors are capable of processing multiple instructions simultaneously through the use of multiple execution units within the processor, resulting in the completion of one or more instructions every clock cycle. Performance analysis of the processor requires the detection of conditions that prevent instructions from completion. Instructions may not be able to be completed for a variety of reasons, including data cache misses (waiting for data from memory or higher level cache memory), data dependency (waiting for the output of a previous instruction) and execution delays (time required to execute an instruction that has the required data).

In many modem computer processors, instructions are loaded into the processor within a group of instructions. The total number of groups of instructions can exceed several thousand. To optimize performance of the computer processor, causes for delays to instruction completions in the computer processor need to be determined. Determining these causes for execution completion delays is especially difficult when evaluating a group of instructions, since each instruction within the group may be delayed for multiple reasons.

Thus, there is a need for a method and system for identifying and evaluating causes of instruction completion delays for groups of instructions being processed by the computer processor, in order to provide needed information for improving the efficiency of the processor.

SUMMARY OF THE INVENTION

The present invention provides a method and system for analyzing instruction completion delays for a group of instructions. Each instruction in a group has a status indicator that identifies what is preventing that instruction from finishing execution. Exemplary causes for preventing the instruction from finishing are data cache misses, data dependency on a result of another instruction, or a delay inherent with the actual execution of the instruction in an appropriate execution unit in the processor. As each instruction in the group of instructions completes execution, the status indicators associated with that instruction are cleared to indicate that the instruction is no longer waiting to complete. The last instruction remaining in the group to complete is the instruction that is holding up completion of the entire group of instructions. Thus, the cause of delay for the last instruction is deemed to be the cause of delay for the entire group of instructions.

Associated with each status indicator is a counter, which measures every clock cycle between the time the group of instructions begin execution until all instructions in the group have completed execution. The counter associated with the cause for the delay of the last instruction in the group to execute is incremented by the number of clock cycles required to execute the entire group of instructions. Counters associated with other delay causes that were not the cause for delaying execution of the last instruction are reset to their value held before the current group of instructions began execution.

Subsequent groups of instructions are then evaluated using the same system of status indicators and counters. When all groups of instructions have been executed, each counter contains a summation of clock cycles showing the overall time delays to complete each group, thus revealing an overall cause for all group delays.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
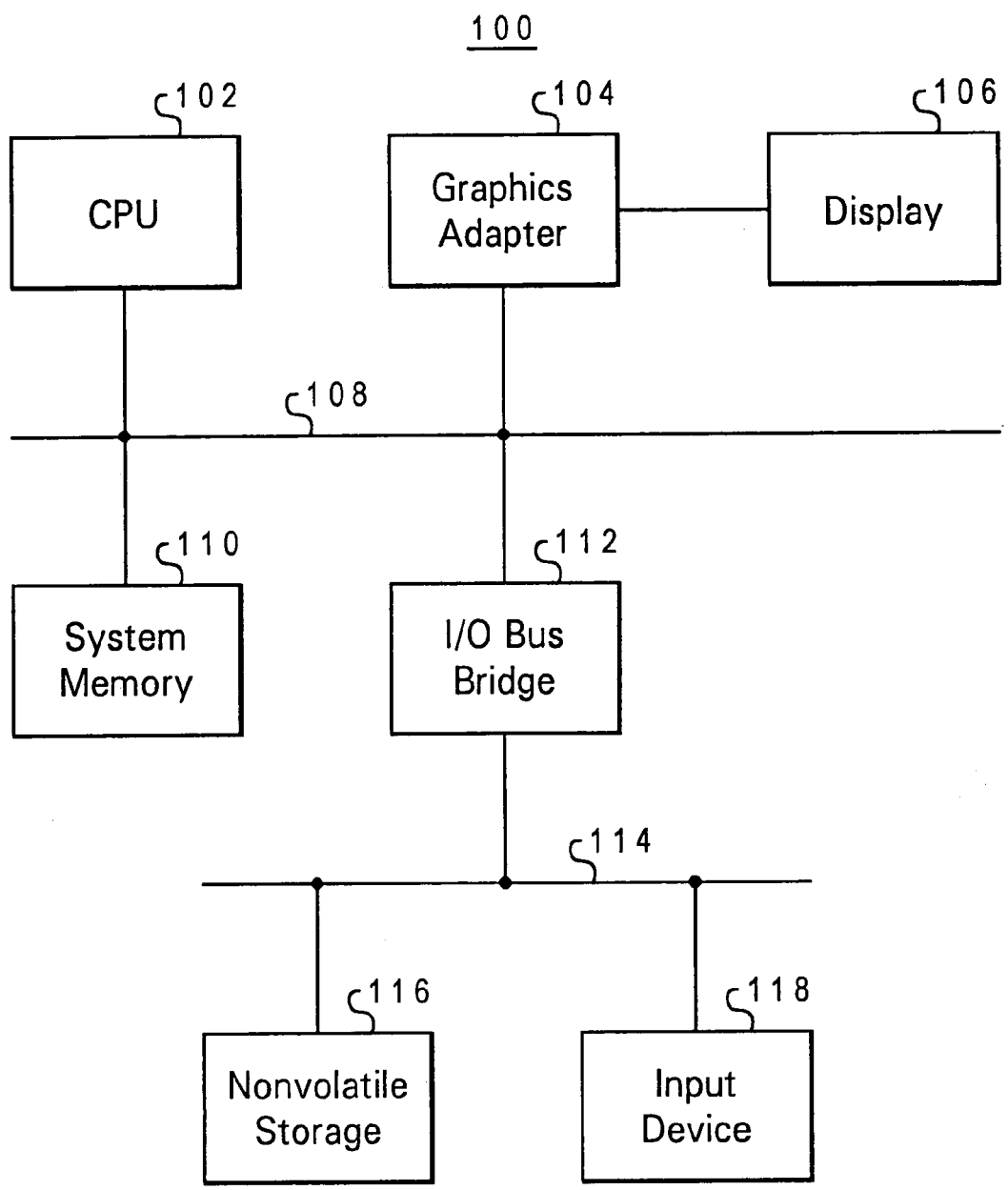
FIG. 1 is a block diagram of an exemplary computer system used in the present invention.

With reference now to the figures and, in particular, to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Figure 2:
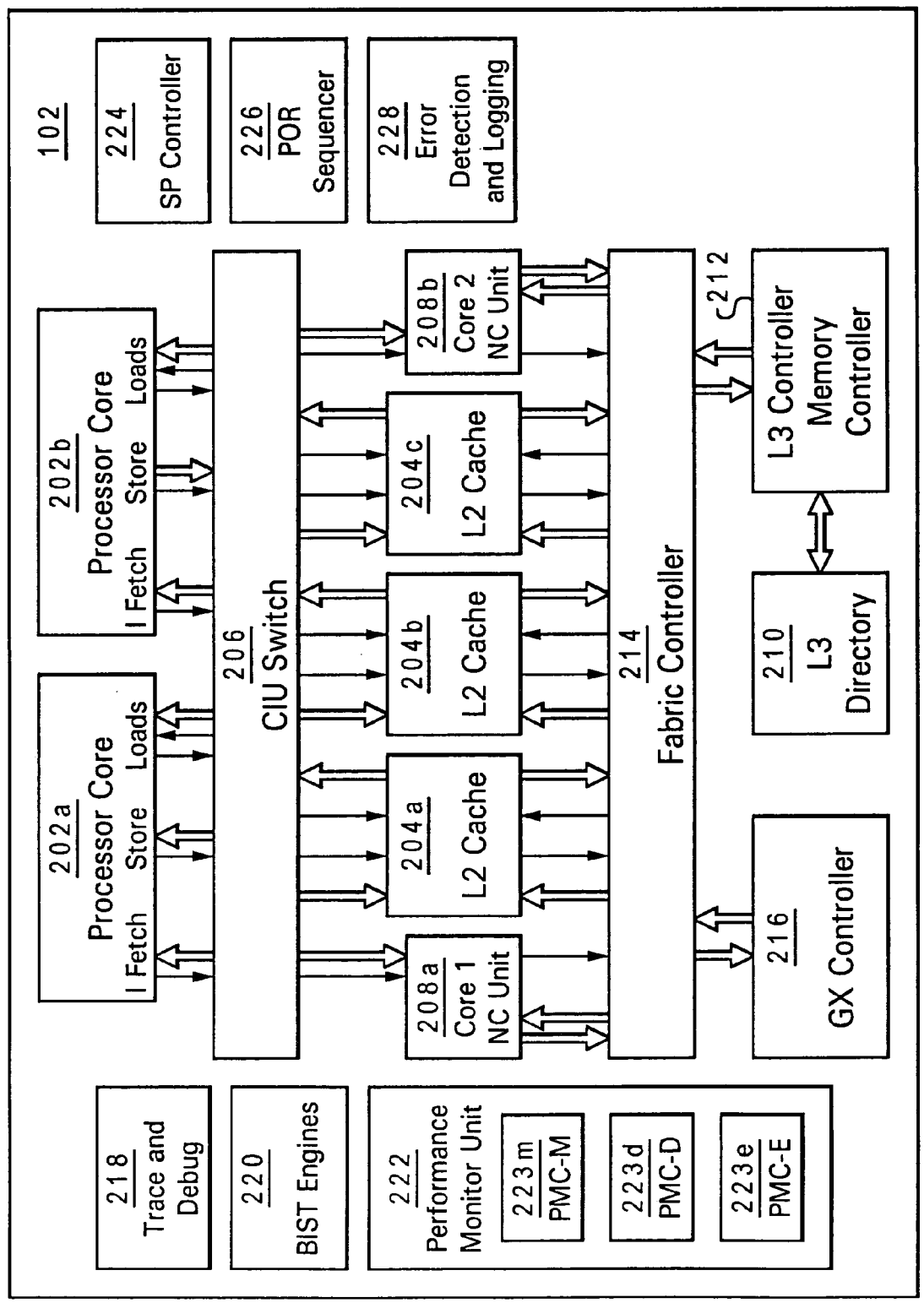
FIG. 2 depicts an exemplary processor used with the present invention.

The CPU 102 described in FIG. 1 is preferably a microprocessor such as the POWER4™ chip manufactured by International Business Machines, Inc. of Armonk, N.Y. With reference now to FIG. 2, such an exemplary microprocessor is depicted as CPU 102. In the preferred embodiment, at least two processor cores 202a and 202b are included in CPU 102. Processor cores 202 share a unified second-level cache system depicted as L2 caches 204a–204c, through a core interface unit (CIU) 206. CIU 206 is a crossbar switch between the L2 caches 204a–204c, each implemented as a separate, autonomous cache controller, and the two CPUs 202. Each L2 cache 204 can operate concurrently and feed multiple bytes of data per cycle. CIU 206 connects each of the three L2 caches 204 to either an L1 data cache (shown as D-cache 311 in FIG. 3) or an L1 instruction cache (shown as I-cache 320 in FIG. 3) in either of the two CPUs 102. Additionally, CTU 206 accepts stores from CPU 102 across multiple-byte-wide buses and sequences them to the L2 caches 204. Each CPU 102 has associated with it a non-cacheable (NC) unit 208 (shown as NC units 208a–b) responsible for handling instruction-serializing functions and performing any noncacheable operations in the storage hierarchy. Logically, NC unit 208 is part of L2 cache 204.

An L3 directory 210 for a third-level cache, L3 (not shown), and an associated L3 controller 212 are also part of CPU 102. The actual L3 may be onboard CPU 102 or on a separate chip. A separate functional unit, referred to as a fabric controller 214, is responsible for controlling data flow between the L2 cache, including L2 cache 204 and NC unit 208, and L3 controller 212. Fabric controller 214 also controls input/output (I/O) data flow to other CPUs 102 and other I/O devices (not shown). For example, a GX controller 216 can control a flow of information into and out of CPU 102, either through a connection to another CPU 102 or to an I/O device.

Also included within CPU 102 are functions logically called pervasive functions. These include a trace and debug facility 218 used for first-failure data capture, a built-in self-test (BIST) engine 220, a performance-monitoring unit (PMU) 222, a service processor (SP) controller 224 used to interface with a service processor (not shown) to control the overall data processing system 100 shown in FIG. 1, a power-on reset (POR) sequencer 226 for sequencing logic, and an error detection and logging circuitry 228.

As depicted, PMU 222 includes performance monitor counters (PMC) m, d and e. PMCs 223m, d, e may be allocated to count various events related to CPU 102. For example, PMC's 223m, d, e may be utilized in the calculation of cycles per instruction (CPI) by counting cycles spent due to Data Cache Misses (PMC-DM), data dependencies (PMC-DD) or execution delays (PMC-EX).

Figure 3:
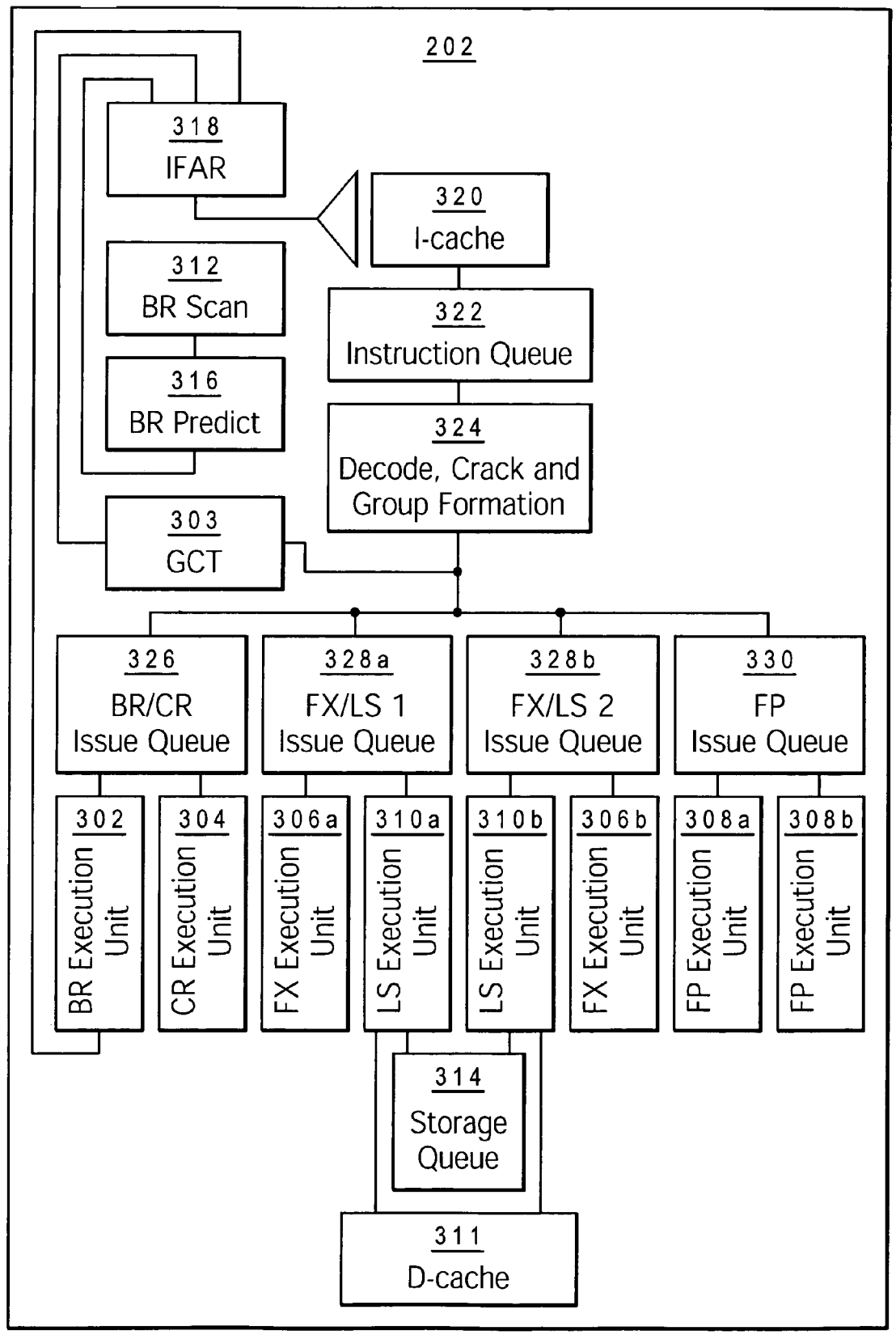
FIG. 3 illustrates an exemplary processor core used with the present invention.

With reference now to FIG. 3, there is depicted a high-level block diagram of processor core 202 depicted in FIG. 2. The two processor cores 202 shown in FIG. 2 are on a single chip and are identical, providing a two-way Symmetric Multiprocessing (SMP) model to software. Under the SMP model, either idle processor core 202 can be assigned any task, and additional CPUs 102 can be added to improve performance and handle increased loads.

The internal microarchitecture of processor core 202 is preferably a speculative superscalar out-of-order execution design. In the exemplary configuration depicted in FIG. 3, multiple instructions can be issued each cycle, with one instruction being executed each cycle in each of a branch (BR) execution unit 302, a condition register (CR) execution unit 304 for executing CR modifying instructions, fixed point (FX) execution units 306a and 306b for executing fixed-point instructions, load-store execution units (LSU) 310a and 310b for executing load and store instructions, and floating-point (FP) execution units 308a and 308b for executing floating-point instructions. LSUs 310, each capable of performing address-generation arithmetic, work with data cache (D-cache) 311 and storage queue 314 to provide data to FP execution units 308.

A branch-prediction scan logic (BR scan) 312 scans fetched instructions located in Instruction-cache (I-cache) 320, looking for multiple branches each cycle. Depending upon the branch type found, a branch-prediction mechanism denoted as BR predict 316 is engaged to help predict the branch direction or the target address of the branch or both. That is, for conditional branches, the branch direction is predicted, and for unconditional branches, the target address is predicted. Branch instructions flow through an Instruction-fetch address register (IFAR) 318, and I-cache 320, an instruction queue 322, a decode, crack and group (DCG) unit 324 and a branch/condition register (BR/CR) issue queue 326 until the branch instruction ultimately reaches and is executed in BR execution unit 302, where actual outcomes of the branches are determined. At that point, if the predictions were found to be correct, the branch instructions are simply completed like all other instructions. If a prediction is found to be incorrect, the instruction-fetch logic, including BR scan 312 and BR predict 316, causes the mispredicted instructions to be discarded and begins refetching instructions along the corrected path.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, then I-cache 320 is accessed and retrieves multiple instructions per cycle. The I-cache 320 is accessed using an I-cache directory (IDIR) (not shown), which is indexed by the effective address of the instruction to provide required real addresses. On an I-cache 320 cache miss, instructions are returned from the L2 cache 204 illustrated in FIG. 2.

In a preferred embodiment, CPU 102 uses a translation-lookaside buffer (TLB) and a segment-lookaside buffer (SLB) (neither shown) to translate from the effective address (EA) used by software and the real address (RA) used by hardware to locate instructions and data in storage. The EA, RA pair is stored in a two-way set-associative array, called the effective-to-real address translation (ERAT) table (not shown). Preferably, CPU 102 implements separate ERATs for instruction-cache (LERAT) and data-cache (DERAT) accesses. Both ERATs are indexed using the effective address.

When the instruction pipeline is ready to accept instructions, the IFAR 318 content is sent to I-cache 320, IDIR, IERAT, and branch-prediction logic. IFAR 318 is updated with the address of the first instruction in the next sequential sector. In the next cycle, instructions are received from I-cache 320 and forwarded to instruction queue 322 from which DCG unit 324 pulls instructions and sends them to the appropriate instruction issue queue, either BR/CR issue queue 326, fixed-point/load-store (FX/LD) issue queues 328a–328b, or floating-point (FP) issue queue 330.

As instructions are executed out of order, it is necessary to remember the program order of all instructions in flight. To minimize the logic necessary to track a large number of in-flight instructions, groups of instructions are formed. The individual groups are tracked through the system. That is, the state of the machine is preserved at group boundaries, not at an instruction boundary within a group. Any exception causes the machine to be restored to the state of the oldest group prior to the exception.

A group contains multiple internal instructions referred to as Internal OPerations (IOPs). In a preferred embodiment, in the decode stages, the instructions are placed sequentially in a group—the oldest instruction is placed in slot 0, the next oldest one in slot 1, and so on. Slot 4 is reserved solely for branch instructions. If required, no-ops are inserted to force the branch instruction to be in the fourth slot. If there is no branch instruction, slot 4 contains a no-op. Only one group of instructions is dispatched, i.e., moved into an issue queue, in a cycle, and all instructions in a group are dispatched together. Groups are dispatched in program order. Individual IOPs are issued from the issue queues to the execution units out of program order.

Results are committed, i.e., released to downstream logic, when the group completes. A group can complete when all older groups have completed and when all instructions in the group have finished execution. Only one group can complete in a cycle.

For correct operation, certain instructions are not allowed to execute speculatively. To ensure that the instruction executes nonspeculatively, it is not executed until it is the next one to complete. This mechanism is called completion serialization. To simplify the implementation, such instructions form single instruction groups. Examples of completion serialization instructions include loads and stores to guarded space and context-synchronizing instructions such as the move-to-machine-state-register instruction that is used to alter the state of the machine.

In order to implement out-of-order execution, many, but not all, of the architected registers are renamed. To ensure proper execution of these instructions, any instruction that sets a nonrenamed register terminates a group.

Instruction groups are dispatched into the issue queues one group at a time. As a group is dispatched, control information for the group is stored in a group completion table (GCT) 303. The GCT can store up to 20 groups. The primary information stored in the GCT is the instructions in the group, each instruction's program order, and each instruction's execution order, which is often different from the program order in a scalar, super-scalar, or parallel processor. The GCT table logically associates IOPS, which may be physically stored in a single memory section or logically connected between multiple memory sections, hardware devices, etc. as readily understood by those skilled in the art. The GCT entry also contains the address of the first instruction in the group. As instructions finish execution, that information is registered in the GCT entry for the group. Information is maintained in the GCT until the group is retired, i.e., either all of its results are committed, or the group is flushed from the system.

Instructions are dispatched into the top of an issue queue, such as FP issue queue 330, FX/LD issue queues 328 and BR/CR issue queue 326. As each instruction is issued from the queue, the remaining instructions move down in the queue. In the case of two queues feeding a common execution unit (not shown in FIG. 3), the two queues are interleaved. The oldest instruction that has all of its sources set in the common interleaved queue is issued to the execution unit.

Before a group can be dispatched, all resources to support that group must be available. If they are not, the group is held until the necessary resources are available. To successfully dispatch, the following resources are assigned:

GCT entry: One GCT entry is assigned for each group. It is released when the group retires.

Issue queue slot: An appropriate issue queue slot must be available for each instruction in the group. It is released when the instruction in it has successfully been issued to the execution unit. Note that in some cases this is not known until several cycles after the instruction has been issued. As an example, a fixed-point operation dependent on an instruction loading a register can be speculatively issued to the fixed-point unit before it is known whether the load instruction resulted in an L1 data cache hit. Should the load instruction miss in the cache, the fixed-point instruction is effectively pulled back and sits in the issue queue until the data on which it depends is successfully loaded into the register.

Rename register: For each register that is renamed and set by an instruction in the group, a corresponding renaming resource must be available. The renaming resource is released when the next instruction writing to the same logical resource is committed.

Load reorder queue (LRQ) entry: An LRQ entry must be available for each load instruction in the group. These entries are released when the group completes. The LRQ contains multiple entries.

Store reorder queue (SRQ) entry: An SRQ entry must be available for each store instruction in the group. These entries are released when the result of the store is successfully sent to the L2 cache, after the group completes. The SRQ contains multiple entries as well.

As noted previously, certain instructions require completion serialization. Groups so marked are not issued until that group is the next to complete (i.e., all prior groups have successfully completed). Additionally, instructions that read a nonrenamed register cannot be executed until we are sure that all writes to that register have completed. To simplify the implementation, any instruction that writes to a nonrenamed register sets a switch that is reset when the instruction finishes execution. If the switch is set, this blocks dispatch of an instruction that reads a nonrenamed register. Writes to a nonrenamed register are guaranteed to be in program order by making them completion-serialization operations.

Since instruction progression through the machine is tracked in groups, when a particular instruction within a group must signal an interrupt, this is achieved by flushing all of the instructions (and results) of the group and then redispatching the instructions into single instruction groups. A similar mechanism is used to ensure that the fixed-point exception register summary overflow bit is correctly maintained.

Referring now to Table I-a, there is depicted a group completion table (GCT) for a group of three instructions. It is understood that a group of instructions may contain any number of instructions, depending on the processor's architecture. As noted above, the group information depicted in the following tables may be in a same memory area, or preferably refers to data stored in different locations but logically associated to reflect the information shown.

TABLE I-a

| Program order | Instruction | Data cache Miss flag (DM) | Data Dependency flag (DD) | Execution delay flag (EX) | Execution order |
|---|---|---|---|---|---|
| 1 | ADD R1, mem | | | ✓ | |
| 2 | ADD R2, R1 | | | ✓ | |
| 3 | LOAD R3, A | | | ✓ | |

Information in the GCT shown in Table I-a, shown for illustrative purposes of the present invention, includes the program order of the instruction as written in the program, the instructions themselves, and the execution (completion) order of each instruction, which in a scalar, super-scalar or multi-processor, as described above, may be different from the program order.

In addition, the group completion table depicted in Table I-a includes status indicators depicted as a "Data cache miss flag (M)," a "Data dependency flag (D)," and an "Executing flag (E)." These flags maybe hardware or software implemented, and are logically associated with the other data in the GCT.

"Data cache miss flag (M)" indicates that data needed to execute the instruction is not available in L1 cache, and must be retrieved from higher level cache or other memory. "Data dependency flag (D)" indicates that the instruction is waiting on a result of another instruction. "Executing flag (E)" indicates that the instruction is in the process of execution within an appropriate execution unit.

For example, at the time depicted in Table I-a for the GCT, a first program instruction "ADD R1, mem" is attempting to execute the instruction of adding the contents of memory location "mem" to the contents of Register R1 and storing the result in Register R1. Assuming the values being added are floating pointing numbers, such an instruction may be executed in one of the FP execution units 308 depicted in FIG. 3. A second program instruction "ADD R2, R1" is likewise executing in one of the FP execution units 308 depicted in FIG. 3. Depending on the current status of logic execution, the first and second program instruction may execute in the same or different FP execution units 308. Likewise, a third program instruction "LOAD R3, A" is attempting to load a value defined by the program as "A" into register R3 using one of the LSUs 310 shown in FIG. 3.

Concurrent with the execution stages depicted in the GCT of Table I-a, associated performance monitoring counters (PMCs) 223 located within PMU 222 shown in FIG. 2, count the number of clock cycles spent. PMC 223*m* is associated with the data cache miss flag (DM), PMC 223*d* is associated with the data dependency flag (DD) and PMC 223*e* is associated with the executing flag (EX). The contents of these PMCs are depicted in Table I-b.

TABLE I-b

| Delay cause | Data cache Miss (PMC-DM) | Data Dependency (PMC-DD) | EXecution delay (PMC-EX) |
|---|---|---|---|
| PMC Content (total cycles) | 1 | 1 | 1 |

Note that while only the (E) flag is active in Table I-a, all PMC contents shown in Table I-b are incremented by one to reflect the passage of one clock cycle. The reason for increasing all PMCs will be made clear below.

Continuing with the exemplary GCT shown in Table I-a, Table II shows the same GCT and associated PMCs from Table I-b after a second clock cycle has passed. For purposes of illustration, assume the value "A" is not in L1 cache, but is in L2 cache. Also, assume that the contents of memory location "mem" is not in any cache level memory.

TABLE II

| Program order | Instruction | Data cache Miss flag (DM) | Data Dependency flag (DD) | Execution delay flag (EX) | Execution order |
|---|---|---|---|---|---|
| 1 | ADD R1, mem | ✓ | | | |
| 2 | ADD R2, R1 | | ✓ | | |
| 3 | LOAD R3, A | ✓ | | | |

| Delay cause | Data cache Miss (PMC-DM) | Data Dependency (PMC-DD) | EXecution delay (PMC-EX) |
|---|---|---|---|
| PMC Content (total cycles) | 2 | 2 | 2 |

Instruction #1 is unable to continue executing, since "mem" is not in L1 cache (or initially any other cache memory) and must be retrieved from memory, thus there is a delay caused by the cache miss. Instruction #2 is unable to continue executing, since it is waiting for data from the updated content of register "R1" from Instruction #1. Instruction #3 is unable to continue executing since the value for "A" is not in L1 cache. Note that all PMCs are advanced by one (totaling 2) to record the passage of the second clock cycle.

In Table III, assume four more clock cycles have passed.

TABLE III

| Program order | Instruction | Data cache Miss flag (DM) | Data Dependency flag (DD) | Execution delay flag (EX) | Execution order |
|---|---|---|---|---|---|
| 1 | ADD R1, mem | ✓ | | | |
| 2 | ADD R2, R1 | | ✓ | | |
| 3 | LOAD R3, A | | | | 1 |

| Delay cause | Data cache Miss (PMC-DM) | Data Dependency (PMC-DD) | EXecution delay (PMC-EX) |
|---|---|---|---|
| PMC Content (total cycles) | 6 | 6 | 6 |

By this time, Instruction #3 has found the value "A" in L2 cache, has completed execution, and thus is shown as being the first to execute. Instruction #1 is still looking for the contents of "mem," and Instruction #2 is still waiting on Instruction #1 to complete execution.

In Table IV, assume that a total of ten clock cycles have passed.

TABLE IV

| Program order | Instruction | Data cache Miss flag (DM) | Data Dependency flag (DD) | Execution delay flag (EX) | Execution order |
|---|---|---|---|---|---|
| 1 | ADD R1, mem | | | ✓ | |
| 2 | ADD R2, R1 | | ✓ | | |
| 3 | LOAD R3, A | | | | 1 |

| Delay cause | Data cache Miss (PMC-DM) | Data Dependency (PMC-DD) | EXecution delay (PMC-EX) |
|---|---|---|---|
| PMC Content (total cycles) | 10 | 10 | 10 |

At this stage, Instruction #1 has retrieved the content of "mem" and is executing the instruction in one of the FP execution units 330 shown in FIG. 3. Instruction #2 is still waiting on Instruction #1 to complete execution.

In Table V, assume that one more clock cycle has passed for a total of 11.

TABLE V

| Program order | Instruction | Data cache Miss flag (DM) | Data Dependency flag (DD) | Execution delay flag (EX) | Execution order |
|---|---|---|---|---|---|
| 1 | ADD R1, mem | | | | 2 |
| 2 | ADD R2, R1 | | ✓ | | |
| 3 | LOAD R3, A | | | | 1 |

| Delay cause | Data cache Miss (PMC-DM) | Data Dependency (PMC-DD) | EXecution delay (PMC-EX) |
|---|---|---|---|
| PMC Content (total cycles) | 11 | 11 | 11 |

At this point, Instruction #1 has completed executing, and Instruction #2 now has the required updated data from Register R1. As soon as Instruction #2 finishes executing, the entire group shown in the GCT can be deemed complete.

In Table VI, all instructions in the GCT have completed, and analysis can now be performed to determine the cause of the delay in executing the entire group.

TABLE VI

| Program order | Instruction | Data cache Miss flag (DM) | Data Dependency flag (DD) | Execution delay flag (EX) | Execution order |
|---|---|---|---|---|---|
| 1 | ADD R1, mem | | | | 2 |
| 2 | ADD R2, R1 | | | | 3 |
| 3 | LOAD R3, A | | | | 1 |

| Delay cause | Data cache Miss (PMC-DM) | Data Dependency (PMC-DD) | EXecution delay (PMC-EX) |
|---|---|---|---|
| PMC Content (total cycles) | 0 | 12 | 0 |

The last status indicator flag, except for the final executing flag, to be active was the Data Dependency (D) flag for Instruction #2, as shown above in Table IV. Thus, the overall cause for delay in executing all of the group is deemed to be Data Dependency, which is responsible for the 12 clock cycles needed to complete execution of the group. In an alternative embodiment, logic can be implemented in hardware or software to reflect that the first and last clock cycles were requisite executing cycles, and thus the Data Dependency delay is only 10 cycles long. However, in a preferred embodiment, all clock cycles are attributed to the cause of the delay indicated before the final execution of the last instruction to complete. By attributing all cycles to a single delay cause, uniformity is achieved when counting only execution delays. That is, if no cache misses or data dependencies occur during execution of the group of instructions, then all clock cycles are attributed to the "Executing flag" delay for that group of instructions. Thus, a uniformity in measurement is achieved by assigning fault for the group delay to the last delay before final execution, even if that last delay is an execution delay.

Note that the PMC registers associated with "Cache miss" and "Executing" are reset to "0," their respective values at the beginning of execution of the group of instructions. In a preferred embodiment, these values are "rewound" using a rewind register as described in U.S. patent application Ser. No. 10/210,357 entitled "SPECULATIVE COUNTING OF PERFORMANCE EVENTS WITH REWIND COUNTER" and filed Jul. 31, 2002, herein incorporated by reference in its entirety.

Assume now that a second group of instructions is to be executed. The contents of the PMC registers are initially as shown in Table VI. Upon completion of execution of the second group of instructions, it is determined that the cause for the delay of the second group of instructions to complete execution was a cache miss holding up the last instruction. Assuming the second group took 14 clock cycles to complete, after completion of the last instruction the contents of the PMC register is as shown in Table VII.

TABLE VII

| Delay cause | Data cache Miss (PMC-DM) | Data Dependency (PMC-DD) | EXecution delay (PMC-EX) |
|---|---|---|---|
| PMC Content (total cycles) | 14 | 12 | 0 |

Note that the content of the Data Dependency register has been rewound (reset) to "12" and the contents of the Executing register has been rewound to "0." Subsequent groups of instructions are then executed, while the PMCs continue to keep a running total of the causes of the delay for the last instruction in each group. By taking steps to eliminate the overall cause of the last delay for the last instruction in each group, then the processor will complete execution of all groups sooner, thus improving overall performance.

Figure 4:
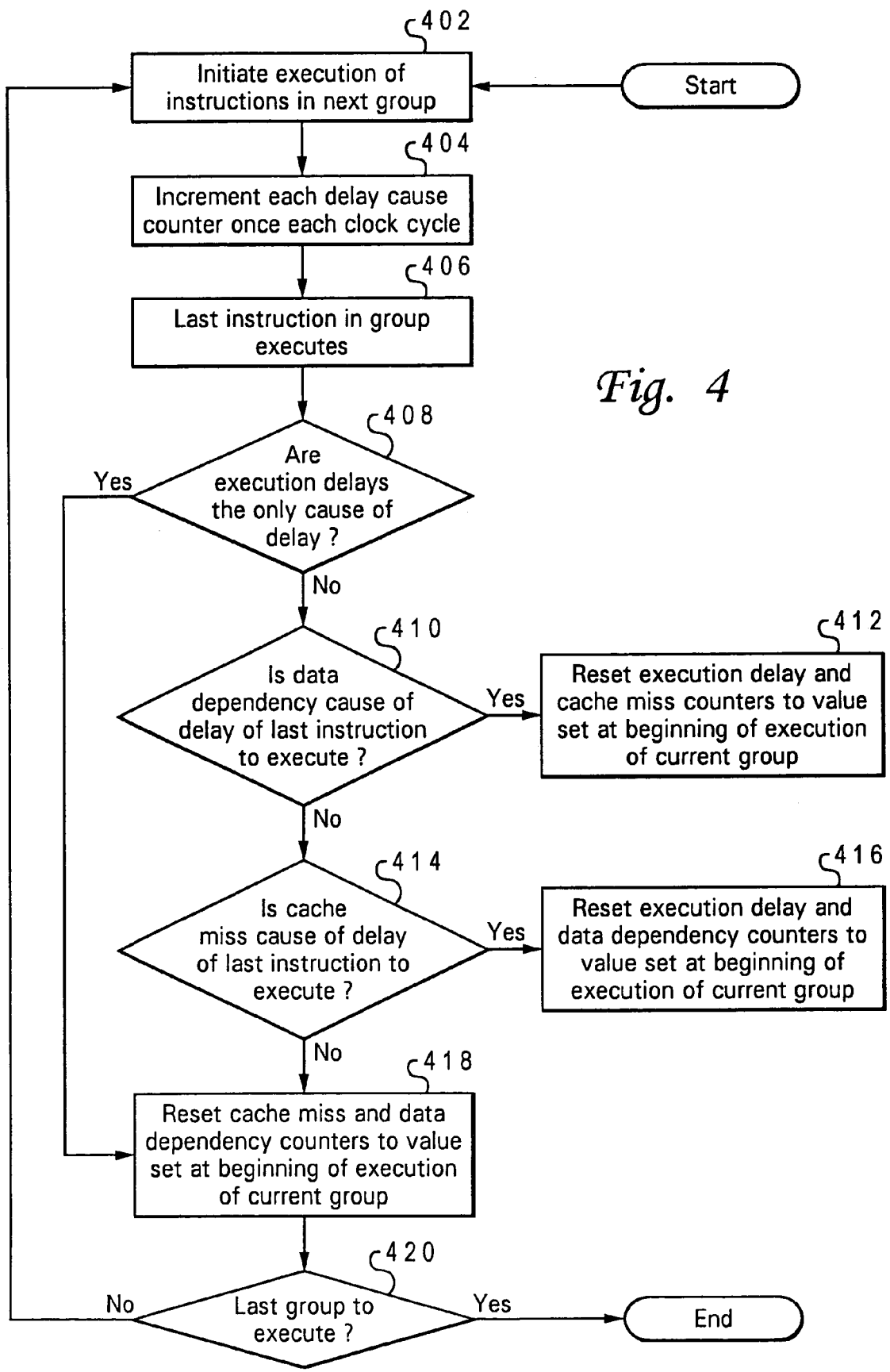
FIG. 4 is a flowchart of logic used in the present invention for determining group execution delay times measured in processor clock cycles.

The above process is described in the flowchart of FIG. 4. Starting at block 402, a group of instructions begins execution. While the group is being executed, a Performance Monitoring Counter (PMC) for every possible delay cause is incremented once each clock cycle, as described in block 404. At some point, it is determined that the last instruction in the group of instructions has completed execution, as depicted in block 406. A determination is made, as described in query block 408, whether the only causes for delays are execution delays, where the instruction is being executed in its appropriate execution unit. If so, then all charges for the delay in executing the entire group of instructions are "charged" to execution delays, and the PMCs for the data dependency and cache miss causes are reset to their values contained at the beginning of the group execution, as described in block 418. Thus the PMC for execution delays contains the number of clock cycles required to complete the current group of instructions, plus any charges incurred from previous groups of instructions in which only execution delays occurred for the group.

If the last delay, prior to the final execution delay, was from a data dependency, as described in query block 410, then the data dependency PMC retains the value reflecting the total clock cycles used to execute the entire group of instructions (plus any previous charges from previous groups), while the execution delay and cache miss PMCs are reset to their values held prior to execution of the current block of instructions, as shown in block 412. As shown in block 414, if the last instruction is delayed by a cache miss, then the PMC for cache misses retains the value reflecting the number of clock cycles required for the current group of instructions (plus any previous charges from previous groups), and the execution delay and data dependency PMCs are reset to their values contained at the beginning of the current group execution, as described in block 416.

Finally, as queried in block 420, a determination is made whether the current group is the last to execute. If not, then the next group is executed, as shown in block 402, and a running total of causes of the delay for the last instruction to execute in each group is kept in each PMC for each delay cause.

The present invention therefore provides a mechanism for evaluating all groups of instructions in process. By determining what caused each group of instructions from being completed (delay cause), an overall cause for all of the groups of instructions can be evaluated, allowing a programmer and/or computer architect to evaluate bottlenecks to execution. For example, if cache miss delays are the most common cause for delays to executing groups of instructions, then additional cache memories might be added. If data dependency delays are the most common problem, then the software may need to be evaluated for pipelining changes, or additional execution units may be needed in hardware. If execution delays are the main hold-up, then additional execution units may need to be added or additional CPUs connected to improve cycles-per-instruction (CPI) time.

It should further be appreciated that the method described above can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read-only memories (CD ROMS) and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for analyzing instruction completion delays in a processor, said method comprising:
   identifying a plurality of potential completion delay causes for completing a group of instructions;
   assigning a counter to each of said plurality of potential completion delay causes;
   counting in every said counter a number of clock cycles required to complete execution of said group of instructions; and
   upon completion of said group of instructions:
      identifying a final completion delay cause, from said plurality of potential completion delay causes, that delayed execution of a final instruction in said group of instructions;
      retaining said number of clock cycles stored in said counter associated with said final completion delay cause as a final delay count; and
      subtracting said final delay count from all counters assigned to all other completion delay causes that are not said final completion delay cause.

2. The method of claim 1, wherein said retaining step and said subtracting step are cumulative for multiple groups of instructions.

3. The method of claim 1, wherein said final completion delay cause is a cache miss.

4. The method of claim 1, wherein said final completion delay cause is a data dependency, said data dependency resulting from a wait for a result from another instruction.

5. The method of claim 1, wherein said final completion delay cause is an execution delay, said execution delay resulting from a time required for an execution unit in said computer processor to execute an instruction having all required data.

6. The method of claim 1, wherein said group of instructions comprises only one instruction.

7. A system for analyzing instruction completion delays in a processor, said system comprising:
   means for identifying a plurality of potential completion delay causes for completing a group of instructions;
   means for counting, for each of said plurality of potential completion delay causes, a number of clock cycles spent during completion of said group of instructions; and
   means for, upon completion of said group of instructions:
      identifying a final completion delay cause, from said plurality of potential completion delay causes, that delayed execution of a final instruction in said group of instructions;
      retaining said number of clock cycles stored in said counter associated with said final completion delay cause as a final delay count; and
      subtracting said final delay count from all counters assigned to all other completion delay causes that are not said final completion delay cause.

8. The system of claim 7, wherein said means for retaining and subtracting are used to cumulatively retain and store clock cycles associated with final completion delay causes for multiple groups of instructions.

9. The system of claim 7, wherein said final completion delay cause is a cache miss.

10. The system of claim 7, wherein said final completion delay cause is a data dependency, said data dependency resulting from a wait for a result from another instruction.

11. The system of claim 7, wherein said final completion delay cause is an execution delay, said execution delay resulting from a time required for an execution unit in said computer processor to execute an instruction having all required data.

12. The system of claim 7, wherein said group of instructions comprises only one instruction.

13. A computer recordable medium for analyzing instruction completion delays in a processor, said computer usable medium comprising:
- computer program code for identifying a plurality of potential completion delay causes for completing a group of instructions;
- computer program code for assigning a counter to each of said plurality of potential completion delay causes;
- computer program code for counting in every said counter a number of clock cycles required to complete execution of said group of instructions; and
- computer program code for, upon completion of said group of instructions:
  - identifying a final completion delay cause, from said plurality of potential completion delay causes, that delayed execution of a final instruction in said group of instructions;
  - retaining said number of clock cycles stored in said counter associated with said final completion delay cause; and
  - subtracting said number of clock cycles stored in said counter associated with said final completion delay cause from all counters assigned to all other completion delay causes that are not said final completion delay cause.

14. The computer recordable medium of claim 13, wherein said retaining and said subtracting are cumulative for multiple groups of instructions.

15. The computer recordable medium of claim 13, wherein said final completion delay cause is a cache miss.

16. The computer recordable medium of claim 13, wherein said final completion delay cause is a data dependency, said data dependency resulting from a wait for a result from another instruction.

17. The computer recordable medium of claim 13, wherein said final completion delay cause is an execution delay, said execution delay resulting from a time required for an execution unit in said computer processor to execute an instruction having all required data.

18. The computer recordable medium of claim 13, wherein said group of instructions comprises only one instruction.

19. A system for analyzing instruction completion delays in a processor, said system comprising:
- a status indicator that identifies at least one potential completion delay cause for completing a current group of instructions;
- at least one counter, each said counter associated with a specific said status indicator and each said counter counting a number of clock cycles required to complete execution of said current group of instructions; and
- a reset mechanism, wherein upon completion of said group of instructions, said reset mechanism resets, to a value representing a number of clock cycles counted before initiating execution of said current group of instructions, each said counter that is not associated with a status indicator that identifies a final completion delay cause that delayed execution of a final instruction of said current group of instructions.

20. The system of claim 19, wherein a counter, which is associated with said status indicator that identifies said final completion delay cause, cumulatively retains and stores clock cycles associated with final completion delay causes for multiple groups of instructions.

21. The system of claim 19, wherein said final completion delay cause is a cache miss.

22. The system of claim 19, wherein said final completion delay cause is a data dependency, said data dependency resulting from a wait for a result from another instruction.

23. The system of claim 19, wherein said final completion delay cause is an execution delay, said execution delay resulting from a time required for an execution unit in said computer processor to execute an instruction having all required data.

24. The system of claim 19, wherein said group of instructions comprises only one instruction.

* * * * *